Patented May 18, 1948

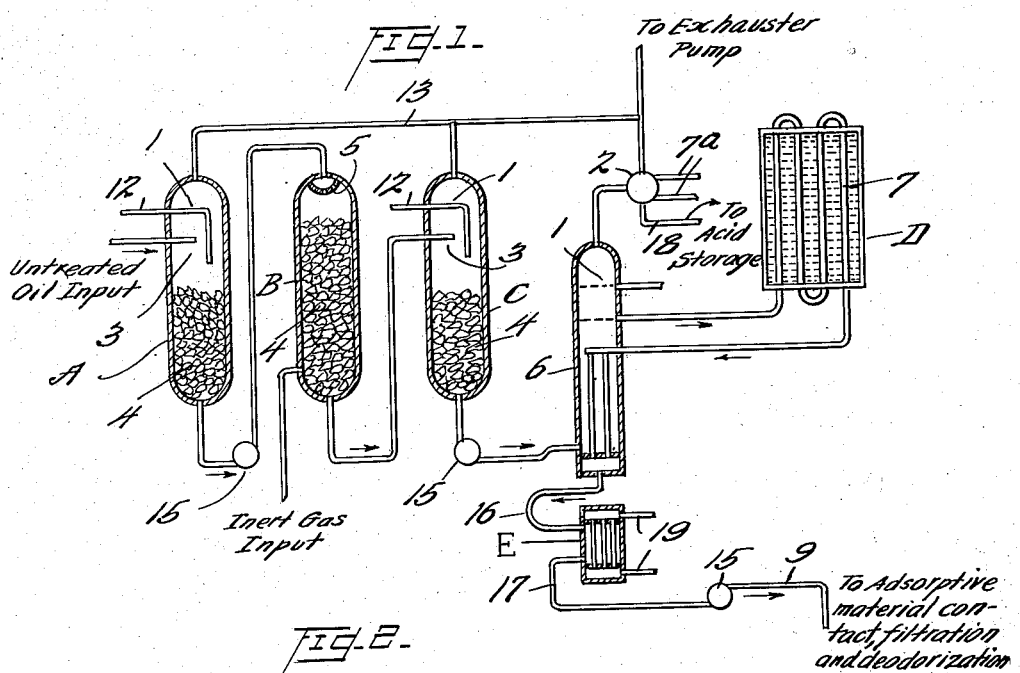

2,441,923

UNITED STATES PATENT OFFICE 2,441,923

TREATING EDIBLE OILS

Francis Michael Sullivan, North Bergen, N. J.

Application July 16, 1941, Serial No. 402,697

13 Claims. (Cl. 99—118)

This invention relates to deodorized glyceride oils, particularly in condition making them directly available for edible purposes, as well as to methods and apparatus for producing such products. Prior art treatments and methods which have been applied to vegetable oils have not recognized the essential basic differences between the vegetable oils in the treatments to which they have been subjected to produce edible products. The most commonly used prior art method of preparation of deodorized vegetable oil products consists essentially of mixing the crude oil with an excess of alkali, usually a solution of sodium hydroxide, generally effective at approximately room temperatures, with removal of the precipitated materials followed by removal of any residual color by mixing with a non-acid activated adsorptive material such as fuller's earth and finally by deodorization of the resulting treated oil by steam distillation under highly reduced pressure at elevated temperatures. A group of oils which are sensitive to and refinable by such alkali treatment include what may be denominated the alkali-sensitive oils including cocoanut, corn, cottonseed, kapok, peanut, soya bean, and sunflower oils, as well as palm kernel oil.

Some of these alkali-sensitive oils have been treated by acid-activated adsorptive material in lieu of the so-called alkali process referred to above. However, that procedure by means of acid-activated adsorptive materials cannot be applied to the preparation of deodorized products of edible quality owing to the fact that the resulting products have a painty flavor, sharply acrid taste and show a readiness toward discoloration. The acid-activated adsorptive treatment has been applied most widely to prepare a deodorized product of edible quality from palm oil which is not sensitive to the ordinary alkali treatments, and palm oil is exceptional both because it is not sensitive to the alkali treatment and also because it yields a product as a result of acid-activated adsorption treatment which is of passable edible quality in spite of that treatment.

In considering these prior art treatments, certain terms used herein are desirably defined for appreciation of the art. Alkali refining refers to the common practice of contacting fat with an aqueous solution of an alkali, usually caustic soda, slightly more alkali being used than is chemically equivalent to the acids in the oil, the refining treatment usually being carried out at approximately room temperature. A precipitate, termed foots, is produced by the alkali treatment and is usually separated from the oil centrifugally or by gravity. Non-acid activated adsorptive materials are finely divided materials that exhibit preferential adsorption and which have not been prepared by treatment with strong acids; whereas acid-activated adsorptive materials are those which have been prepared by contact with a strong acid. Deodorization ordinarily refers to the operation of passing steam or inert gas through a fat at relatively low pressure such as 3 mm. of mercury and at elevated temperatures of for example, 180° C. Edibility as the term is used herein refers to flavor and taste quality that is within or better than the quality range of commercially widely accepted products of the same type.

These prior art treatments have been rather categorically applied to the various oils without true recognition of the differences between the oils. The vegetable oils differ widely from each other both as to the constitutions of the normally useful component, namely the triglycerides, as well as in the identities of the dissolved substances which are designated herein by the term solutes. The solutes of a given oil may be from one or more widely divergent classes of relatively little understood compounds and may include sterols, the phosphatides such as lecithins and cephalins, vitamins, resins, waxes, essential oils, the pentosans, proteoses, and peptones, and the pigment compounds such as carotin, xanthophyll and chlorophyll. Consequently, the various vegetable oils differ radically from each other and from the animal fats and greases and from petroleum, so that each oil presents special problems of its own, in the production of satisfactory deodorized edible products. Because of those differences, in spite of prior art tendencies, it has been found that methods cannot be generally applied to all vegetable oils with the solution of the various problems that arise in connection with oils but the several oils must be treated at least in smaller groups to meet the individual problems that arise.

However, in all prior art deodorization treatments of these vegetable oils, chemical treatment has always been employed along the lines of those indicated above. Although the chemical treatment unfavorably affected flavor and taste and other desired characteristics in edible products, nevertheless such chemical treatments were required because the art did not know how to produce deodorized products of satisfactory flavor and taste and other desired characteristics without the utilization of such chemical treatments.

Among the objects of the present invention are effective deodorization of glyceride oils without chemical treatment, that is, chemical treatment is not essential in accordance with the present process in producing deodorized products of superior character than were heretofore available.

Other objects include the preparation of deodorized fat or oil products of novel character as a result of the treatment set forth herein giving new compositions of wider and greater utility, and enabling new products including new hydrogenated products of greater utility and stability to be produced.

Still further objects include methods of producing products of the character set forth above at greatly reduced cost of manufacture as compared with prior art methods.

Still further objects include the utilization of novel types of apparatus and mechanism for effecting these results.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In connection with that more detailed description, there is shown in the accompanying drawing in Figure 1, a flow sheet diagram of an apparatus capable of carrying out the heat treatment of the present invention; in Figure 2, a cooling rate graph of a deodorized cottonseed oil product produced in accordance with the present invention; and in Figure 3, a cooling rate graph of a deodorized cotton seed oil product of the prior art alkali process.

In accordance with the present invention it has been found that not only is a heat treatment essential in producing satisfactory deodorized products without chemical treatment of stated oils, and thermal treatment must be above a critical lower limit of 200° C., but the treatment must be carefully controlled for maximum effectiveness, since the overall period of heat treatment, or more specifically the period between incipient precipitation and the time of returning to below 160° C., has unexpectedly been found to exert a very important effect on the character of the products obtained. Control of this period is important because the greater its duration, the greater the re-solution of the precipitate. By duration of re-solution is meant the period between incipient precipitation and the time of returning to below 160° C. In normal operations, duration of re-solution is approximated by the period between the time of going above 225° C. and returning to below 160° C. By overall period of heat treatment is meant the period between going above 100° C. and returning to below 100° C.

In the favorable operation of the processes of treating oils, the solutes are precipitated as well as pyrolyzed; the time of heat treatment must be sufficient for good precipitation but on the other hand and of greatest unexpected importance is the fact that duration of re-solution must be limited and preferably minimized to avoid re-solution of precipitated material. Limitation of time also avoids polymerization of glycerides. This is particularly true of the alkali-sensitive oils which are extremely sensitive to changes of the kind referred to.

The duration of re-solution must be restricted if satisfactory results are to be obtained insofar as deodorized products satisfactory for edible use are concerned. This follows because as pointed out above, re-solution of any precipitated solutes may take place and unless such re-solution is avoided, inferior products are produced. It has been found further that the conditions of operation are strongly influenced by the use or avoidance of agitation, and the character of the agitation employed during such heat treatment. In the absence of agitation of any substantial character, the duration of re-solution is less limited. With quite substantial or violent agitation, maximum surface contact between precipitated material and liquid is prevented for re-solution and consequently with the greatest agitation, the duration of re-solution must be very materially reduced. In between these limits the duration of re-solution must be limited so that with the given conditions of agitation prevailing, there is no substantial re-solution of any precipitated solutes and no undesirable polymerization of glycerides. Consequently it may be stated as a general rule that the duration or re-solution limits are dependent primarily on the conditions of agitation which prevail, and in any given treatment, the agitation should not be of such character as to cause re-solution to any substantial extent of any precipitated solutes. As a general rule, therefore, it may be stated in no event should the duration of re-solution exceed approximately 180 minutes even under conditions where there is no substantial agitation during the heat treatment; while with the most vigorous agitation, the time period is cut down very materially to not more than about 10 minutes. In this connection it may be pointed out precipitated solutes may become dissolved and dispersed in the oil during the treatment unless conditions are utilized to prevent any such re-solution to undesired extent. This may be demonstrated by the fact that in a specific case where a sludge was formed in cottonseed oil by a heat treatment and the oil was vigorously agitated at relatively low temperatures, such for example, 180° C. for two hours in contact with such sludge, upon filtration the solids recovered was very much smaller than was the case where such vigorous agitation was omitted. And while the oil was clear but dark in color after filtration, upon standing at room temperature for 60 days a deep layer of a fine sludge of black color formed. This test may be applied to determine whether the products have been satisfactorily treated in accordance with the present invention and after such treatment there should be no substantial precipitation in the oil on standing at room temperature for 60 days.

Refractive index may also be referred to as a criterion in connection with these matters, since change in refractive index is indicative of polymerization of the normally useful fat components, and the refractive index should not change to such an extent as to show undesirable polymerization.

Generally it may, therefore, be stated that essential operating conditions require control of the temperature employed, the time of heat treatment including that at maximum temperature as well as the duration of re-solution, and the conditions of agitation which prevail.

The vegetable oils which are subject to treatment by the present invention to produce satisfactory deodorized products for edible purposes include cottonseed, corn, soya and peanut; and cocoanut, kapok, sunflower and palm oils. However, these oils divide themselves into two sharply differentiated groups. The first group is formed of what may be called sludging oils including cottonseed, corn, soya and peanut, since by the treatment in accordance with the present invention, these oils produce substantial sludges. The other four oils, namely, palm, cocoanut, kapok and sunflower, may be referred to as non-sludging oils since palm and cocoanut oils produce practically no sludge while that from kapok and sunflower is only quite slight. The critical importance of control of operations can best be understood by reference to the treatment of the specific oils themselves. However, there are certain general considerations which may be referred to at this point. For the highest quality products, the oils should not be allowed to contact with ferrous materials during the thermal operation. Also the quality of the deodorized products depends on the absence of oxygen from the oil during such heat treatment, as well as on other conditions, and better products are obtained when oxygen is not present. Desirably, therefore, the oils are treated to remove oxygen prior to the thermal treatment and for that purpose may be subjected, for example, to vacuum or to treatment with an inert gas, or both expedients may be employed.

The treatment of cottonseed oil may be utilized to exemplify the treatment of the sludging oils including cottonseed, corn, soya and peanut and what is said below in connection with cottonseed will be understood to apply also to these sludging oils.

In giving particular times and temperatures for treatment, it will be understood that these are for workable results and that more sharply controlled conditions will be required for producing the highest grade products. It is particularly noteworthy that the rates of re-solution at various temperatures in excess of 160° C. are not sufficiently different to be of comparable importance to turbulency and time. Thus, as a general consideration and leaving polymerization out of the picture for the moment, the limiting duration of re-solution would be 180 minutes approximately whether the maximum temperature employed were the minimum workable, that is, approaching 200° C., or a much higher temperature, for instance, 330° C. The time at which the oil is held at the maximum temperature might be 120 minutes, or 60 minutes, or only momentarily, with the balance of the re-solution period of 180 minutes utilized for bringing the temperature from the temperature of incipient precipitation to the maximum and from the maximum to below 160° C. On the other hand, with quite vigorous agitation the re-solution period would be limited to not more than 10 minutes whether the maximum temperature employed were the minimum workable or a much higher temperature, for instance 330° C. The time at the maximum might be 5 minutes or it might be momentary, still utilizing a duration of re-solution of 10 minutes.

Other examples of heat treatment that may be employed include the production of a satisfactory cottonseed oil product by heating to a maximum of 310° C. with a duration of re-solution of 11 minutes, the oil being maintained at the maximum temperature of 310° C. momentarily only. Again good results with effective removal of pyrolyzed and precipitated solutes have been obtained using a duration of re-solution of 50 minutes heat treatment with 15 minutes at the maximum of 330° C. In the latter case, however, some re-solution of precipitated solutes may take place. It was found that the refractive index did not change under overall periods of 20 minutes or less with 310° C. momentary maximum.

To illustrate the differences in products obtained in accordance with the present invention as compared with prior art products, reference may be made to the graphs shown in Figures 2 and 3. A graph of the cooling rate of cottonseed oil products of the process of the present invention is shown in Figure 2 while Figure 3 shows a graph of the same crude oil after refining by the customary alkali process. The data show gradual crystallization of the product of the new process of the present invention but the product of the alkali process has extensive in-mass crystallization at the solidifying temperature. The deodorized product of the present invention applied to cottonseed oil is definitely a new type of product. The hydrogenated products produced from the deodorized cottonseed oil of the present invention show the same type of graph as the corresponding unhydrogenated materials except that the curves are displaced upward on the temperature scales. The new hydrogenated products are also new materials. The results of the present invention show that contrary to some views in the prior art, hydrogenation is not so much the cause of the so-called "iso-oleic acids" as has commonly been supposed. The prior art methods result in substantial isomerization to form undesirable iso-oleic derivatives, whereas the present invention avoids that difficulty in connection with the cottonseed products. The plasticity and penetration of shortening made from the cottonseed product of the present invention is superior to that of the prior art products and is more consistent and less affected by temperature change. The iodine value of the new hydrogenated products are 4 to 5 points lower at a given penetration than the iodine value of prior art products. The new hydrogenated product shows an increase in its resistance to oxidation that is several times higher than would be expected on the basis of the lower iodine value. It may be noted at this point in passing, that while palm oil is a non-sludging oil, nevertheless palm oil like cottonseed oil is unique in the tendency to form iso-oleic derivatives and what has been said in connection with isomerization to form iso-oleic derivatives in connection with cottonseed oil applies also to palm oil.

In order to explain these graphs reference may be made to the method and apparatus employed for this analysis of the cottonseed oil samples. The same procedure and apparatus were applied to hydrogenated materials except that the bath temperature was adjusted to approximately 20° C. below the temperature at which opaqueness sets in during the test. The apparatus employed was similar to that described for the tentative revision of the titer test, American Society of Testing Materials Standards, sections 35 and 36, 1940 supplement, part 3. The stirrer was motor driven. The differences are: (1) the bath jar is 6 inches in diameter by 8 inches in height; (2) a solvent is used for the bath and the bath is maintained at $-20.0 \pm 0.5°$ C. during the test by adding solid carbon dioxide as required; (2) a thermometer is used in the bath to indicate its temperature. The procedure is similar to that described in the above reference; the only differences being that the readings are taken each minute and the agitation is continued without interruption for 70 minutes after the start of the test.

The treatments as defined above in accordance with the present invention yield a very satisfactory cottonseed oil product. However, various optional treatments may be employed together with the heat treatment of the character described above. Aqueous washing of the oil, alkali and adsorptive treatments may be utilized. As a general rule it is advantageous to wash the crude oil prior to the thermal treatment. For this purpose the oil may be contacted with water say about 10% of its weight at moderate temperatures, as for example, of the order of 45° C. Such treatment coagulates a portion of the solutes which may be then removed by centrifugal or gravity separation.

Alkali treatment as customarily used in the art and referred to above, cannot be applied to the cottonseed oil product of the thermal operation in accordance with the present invention because of stable emulsification. However, alkali treatment may be applied by working (1) at 5 to 10° C., that is, at temperatures substantially below those of normal room temperature with prompt centrifugal separation; (2) under customary temperature methods by adding small amounts, as for example, 1 to 5% of fatty acids of higher melting point than those of the oil undergoing treatment, for example, by the addition of palm fatty acids and mixtures of palmitic with 50% or more of oleic; and (3) by hydrogenating the oil prior to the treatment.

The general conditions set forth above for treatment of cottonseed oil may also be applied to soya bean oil and certain further specific examples may be given. The treatment should be sufficient to give substantial precipitation of the solutes of soya bean oil. Thus, momentary exposure at 285° C. with 390 second overall period and 300 second duration of re-solution gives good precipitation of the pyrolyzed solutes. The most satisfactory results with soya bean oil were obtained by momentary heating to 340° C. in an overall period of 420 seconds, the duration of re-solution being 300 seconds. In such instances of brief overall periods, the refractive index of the oil does not change, substantially. Upon momentary heating to 330° C. in a 40 minute overall period the refractive index increased 0.0020, the color of the oil after separation from the precipitate was much deeper but upon standing 60 days at room temperature a precipitate did not settle from the oil and the deodorized product material had excellent quality. Heat treatment of the soya bean oil in accordance with the present invention is particularly important because as a result thereof the lecithin and phosphatides are precipitated markedly distinguishing the present heat treatment from methods that have been suggested in the art for the heat treatment of soya bean oil.

As in the case of the heat treated cottonseed oil, various optional treatments may be utilized with the soya bean oil. Thus, aqueous washing of the oil may be utilized prior to thermal treatment by contacting the oil with, for example, about 10% of its weight of water at moderate temperatures, such for example, as about 45° C. to coagulate solutes which may then be removed by centrifugal and gravity separation prior to the thermal treatment. Alkali treatment as customarily applied is not applicable to the soya bean oil product of the thermal operation of the present invention which does not contain substantial concentrations of dissolved pyrolyzed solutes because of stable emulsification. However, alkali treatment may be applied to the thermalized product analogously to that of the thermalized cottonseed oil by (1) working at about 0° C. or other temperatures substantially below room temperature with prompt centrifugal separation; (2) with the usual customary temperature methods by first adding 1 to 5% of fatty acids of higher melting point than those of the oil, e. g., palm fatty acids and mixtures of palmitic with 50% or more of oleic; and (3) by hydrogenating the oil prior to the treatment. Cooling rate analysis on the soya bean oil product of the present invention shows that it crystallizes gradually and is free from in mass crystallization.

Corn oil is extremely sensitive to the thermal treatment by which a heavy precipitate is obtainable. The sensitivity is indicated by the refractive index and by the readiness to solution of the precipitate. In the early stages of re-solution, the extent of re-solution can be judged by the color depth of the filtered oil. The product of momentary exposure to 333° C. with an overall period of 51 minutes and 37 minutes duration of re-solution, after filtration has 66% greater depth of color than when the overall period is 20 minutes with 9 minutes duration of re-solution, and it has 50% less color depth than when held at 333° C. for 15 minutes in addition to the 51 minute overall period, the duration of re-solution being 52 minutes. The product of momentary heating at 333° C. with 20 minute overall operating period does not show change in refractive index, while with 51 minute overall period the change is $+0.0004$. When the corn oil is held for 15 minutes at 333° C. with 66 minute overall period the change is $+0.0019$. The magnitude of this change is about the same as caused by hydrogenation of 14% of the unsaturation.

Here again, aqueous washing, alkali and adsorptive treatments may be optionally applied to the processed corn oil. It is usually advantageous to wash corn oil prior to the thermal treatment. Thus it may be contacted with about 10% of its weight of water at about 45° C. to coagulate the solutes which are removed by centrifugal and gravity separation with the water. Alkali treatment as customarily applied is not applicable to the corn oil product of the thermal treatment of the present invention. However, the procedure set forth above in connection with the processed soya bean oil may be applied to the thermalized corn oil. Cooling rate analysis indicates that the corn oil product of the present invention crystallizes gradually free from in mass crystallization.

Peanut oil is one of the oils in this group of sludging oils but the precipitation of solutes obtained with it by thermal operation in accordance with present invention is smaller than that with the other oils of this group. Operation to momentary maximum of 300° C. with a 9 minute overall period and 5 minutes duration of re-solution gives excellent results. The extent of precipitate solution after 30 minutes is about the same as after 15 minutes of overall period in operation to 300° C. and both periods are practical for operation. Here again aqueous washing of the peanut oil prior to thermal treatments may be utilized and alkali and adsorptive treatments may be optionally applied after the thermal treatment. Alkali treatment can be applied with centrifugal separation of foots in the customary manner. Separation of the foots can also be obtained by gravity separation under the customary operating conditions used on crude oil but temperature substantially below normal room temperature, such as temperatures of the order of 10° C. and below are a more favorable operating range. Cooling rate analysis shows that the peanut oil product of the present invention crystallizes gradually free from in mass crystallization.

The above considerations show that the sludging oils constitute a separate and distinct group within the larger group of vegetable oils that can be processed in accordance with the present invention. The production of substantial sludge by such treatment in accordance with the present invention with the group of sludging oils and removal of the sludge markedly distinguishes the present invention from prior art treatment and particularly in the utilization of methods that give satisfactory deodorized oils capable of use for edible purposes without requiring or necessitating chemical treatment.

The non-sludging oils including palm oil, cocoanut oil, kapok and sunflower seed oils form a less homogenous group but desirably may be treated together since this group of oils does not show any substantial sludge during thermal treatment. Palm oil produces no sludge but the conditions of operation may be substantially the same as those generally set forth above in connection with the treatment of cottonseed oil. An excellent product is obtained from palm oil even though palm oil is not an alkali-sensitive oil, that is, the ordinary alkali processing does not produce a satisfactory edible product from palm oil.

With cocoanut oil in this group of non-sludging oils, there is no precipitation or coagulation but there is substantial modification of certain bodies including color bodies with production of a slightly darker color. In view of the fact that there is no precipitation or coagulation during the thermal treatment of the cocoanut oil in accordance with the present invention, re-solution of the precipitates does not enter into the picture, and therefore, the temperature of treatment and overall time of treatment is capable of variation within wider limits. Thus, cocoanut oil may be favorably processed by momentary heating to 320° C. Excellent final deodorized products were obtained using overall periods, for example, of from 6 to 60 minutes. Any precipitate formed is too fine and light for either gravity or centrifugal separation and a filtering medium is used. Aqueous washing, alkali and adsorptive treatments may be optionally applied. Either filter aids or adsorptive agents are advantageous accessories to the filtration of the cocoanut oil product of the thermal treatment of the present invention.

Kapok oil and sunflower seed oil may be favorably processed by analogous treatments. The sunflower thermal precipitate is heavier than that of the kapok oil but neither is bulky. In the case of these oils there is a tendency to the production of brown-black precipitates of a character which are not efficiently separated by gravity alone. Good deodorized products may be obtained using a 60 minute overall period and 44 minutes duration of re-solution with 15 minutes at 330° C., but there is some tendency toward color instability during deodorization. Momentary heating to 330° C. with 6 minute overall period and 4 minute duration of re-solution gives more favorable results from the color stability standpoint. Alkali and adsorptive treatments of the products of the thermal treatment give color stability during deodorization. Aqueous washing, alkali and adsorptive treatments may be optionally applied in a manner as set forth above for other oils. But alkali treatment as customarily applied to the crude oils is not practical owing to the formation of stable emulsions. The procedure set forth above for alkali treatment applied to the processed soya bean oil may, however, be utilized in connection with the kapok and sunflower seed oils.

In general, it may be said that the best results on the oils capable of treatment in accordance with the present invention particularly the alkali-sensitive oils as a group, is obtained by minimizing the heating and cooling periods and using a momentary maximum temperature of 300° C. or higher. These conditions are ideally supplied by continuous operation. The method of separation of any precipitate formed during the thermal treatment depends largely on its bulk. Centrifugal separation is readily applicable to precipitates from unwashed cottonseed, corn and soya bean oils. The precipitates from washed cottonseed, corn, soya bean and from unwashed peanut, cocoanut, kapok and sunflower oils can be effectively removed using water with centrifugal separation or by filtration with or without filter aids.

Mixtures of oils may be processed in accordance with the present invention choosing conditions for operation which are compatible with the character of the oils present in the mixtures and this may be readily determined from the various conditions set forth above in connection with the oils treated in accordance with the present invention.

Figure 1 of the drawing shows a thermal unit that may desirably be utilized for continuous operation in carrying out the present invention. Desirably the entire apparatus is operated under vacuum, as for example, equivalent to 1 mm. of mercury except for the unit B, in which atmospheric or pressure greater than atmospheric may be maintained, for example, by the introduction of an inert gas, such as nitrogen. The oil enters unit A for the purpose of degassing through the inlet over foam-breaks 1, which may be provided by grills of hot steam coils. The oil overflows the feed plate 3, and passes into the ceramic saddle packed portion 4. Steam may be introduced through line 12. From the bottom of the degassing unit A, the oil is pumped by pump 15 to the inert gas absorber B, through distributor nozzle 5. The introduction of inert gas serves to aid removal of oxygen in the second degassing unit C. The oil enters degassing unit C through feed plate 3 over foam-break 1. Here again steam may be introduced through the inlet 12, and packing 4 is also desirably utilized. From the second degassing unit C, the oil is pumped to the heat treatment zone D. Desirably the ingoing and outgoing oil are in heat exchange. For this purpose the incoming oil passes upwardly in the heat exchanger 6 about the down-coming heat treated oil from the heating tube 7. After the incoming oil is subjected to heat exchange in the column 6, 6, the oil enters the heater D and discharges on the opposite side from a point of entry for heat exchange with further quantities of incoming oil. Passage through the heater tubes is by gravity through sloped tubes of the heater D. Ample space in the heater tubes provides for removal of the vapors generated by the heat. Heat is desirably supplied by a molten metal or salt bath. Desirably the heater and exchanger tubes are of glass or glass surfaced in contact with the oil. From the heat exchanger 6, the oil may be further cooled by passage through the water cooled exchanger E. The cooled oil is removed through line 16 and may be pumped, as by line 17, to storage indicated at 9. Foam-breaks 1 may also be provided in the upper portions of the heat exchanger 6.

The fatty acids and other vapors from the thermal operation may be recovered in condenser 2 cooled by water system 7a. Thus fatty acids given off may be collected in line 18 for recovery. Thus the fatty acids may be removed from the exhaust gases by a scrubbing unit, in which a triglyceride is desirably employed to adsorb the fatty acids. The scrubbing unit may be refrigerated by means of a refrigerant from 19, and the fatty acids thus condensed may be continuously cycled through the system by pumps, into the still in which they may be steam distilled by steam from the steam line. Vapors from the scrubbing unit and the still may be exhausted through the line 13.

An alternative arrangement may be utilized by forced flow through the exchanger, heater and cooler with separation of reaction gases and acids after leaving the equipment and during deodorization. A pressure feed pump for this purpose may be located on the inlet line to the exchanger and a flow control outlet on cooler E exit line. In such case an annular pipe type of exchanger may be employed with flow in the inner pipe opposite to that in the annular space.

While as pointed out above, the methods of the present invention give unique results when applied to two distinct groups of vegetable oils, i. e., the sludging oils and the non-sludging oils, in producing edible products therefrom, it has application to various glyceride oils including fish and animal oils such as cod liver oil and to drying or semi-drying oils such as linseed oil, used primarily in the production of paint oils.

This application is a continuation-in-part of abandoned application Serial No. 109,664, filed November 7, 1936, entitled palm oil processing.

Having thus set forth my invention, I claim:

1. In the process of treating an edible food glyceride oil containing naturally-occuring, undesirable solutes, removing oxygen from the oil, heating said oil in the absence of oxygen at a temperature of at least 200° C. but below that at which the oil is undesirably affected, to produce pyrolysis of undesirable solutes during a re-solution heating period of not more than 180 minutes under conditions of temperature, time of treatment, and agitation insufficient to dissolve substantially any sludge formed, and separating pyrolyzed bodies and any formed sludge to yield a product capable of being deodorized by steam distillation under vacuum to produce an edible food oil.

2. In the process of treating an edible food glyceride oil containing naturally-occuring, undesirable solutes, removing oxygen from the oil, heating said oil in the absence of oxygen at a temperature of at least 200° C. but below that at which the oil is undesirably affected, to produce pyrolysis of undesirable solutes without agitation during a re-solution heating period of not more than 180 minutes under conditions of temperature and time of treatment insufficient to dissolve substantially any sludge formed and separating pyrolyzed bodies and any sludge formed to yield a product capable of being deodorized by steam distillation under vacuum to produce an edible food oil.

3. In the process of treating an edible food glyceride oil containing naturally-occurring, undesirable solutes, removing oxygen from the oil, heating said oil in the absence of oxygen at a temperature of at least 200° C. but below that at which the oil is undesirably affected, to produce pyrolysis of undesirable solutes during a re-solution heating period of not more than 10 minutes with vigorous agitation, under condtions of temperature, time of treatment and agitation insufficient to dissolve substantially any sludge formed, separating pyrolyzed bodies and any formed sludge to yield a product capable of being deodorized by steam distillation under vacuum to produce an edible food oil.

4. In the process of treating an edible food glyceride oil containing naturally-occurring, undesirable solutes, washing the oil with water at moderate temperature, removing any coagulate, removing oxygen from the oil, heating said oil in the absence of oxygen at a temperature of at least 200° C. but below that at which the oil is undesirably affected, to produce pyrolysis of undesirable solutes during a re-solution heating period of not more than 180 minutes under conditions of temperature, time of treatment, and agitation insufficient to dissolve substantially any sludge formed, and separating pyrolyzed bodies and any formed sludge to yield a product capable of being deodorized by steam distillation under vacuum to produce an edible food oil.

5. In the process of treating an edible food glyceride oil containing naturally-occurring, undesirable solutes, removing oxygen from the oil, heating said oil in the obsence of oxygen at a temperature of at least 200° C. but below that at which the oil is undesirably affected, to produce pyrolysis of undesirable solutes during a re-solution heating period of not more than 180 minutes under conditions of temperature, time of treatment, and agitation insufficient to dissolve substantially any sludge formed, and separating pyrolyzed bodies and any formed sludge, subjecting the treated oil to alkali treatment at temperatures not above about 10° C. and thereafter promptly separating any deposited material to yield a product capable of being deodorized by steam distillation under vacuum to produce an edible food oil.

6. In the process of treating an edible food glyceride oil, heating said oil at a temperature of at least 200° C. during a re-solution heating period of not more than 180 minutes under conditions of temperature, time of treatment, and agitation insufficient to dissolve substantially any sludge formed, and separating pyrolyzed bodies, and any formed sludge to produce an oil capable of being deodorized by steam distillation under vacuum, adding a small amount of fatty acids of melting point higher than those of the oil undergoing treatment and then alkali refining to produce an edible food oil.

7. A process as set forth in claim 1, with which there is utilized hydrogenation of the thermalized oil followed by alkali refining.

8. A process as set forth in claim 1 in which the oil is a sludging oil.

9. A process as set forth in claim 1, in which the treated oil is a non-sludging oil.

10. A process as set forth in claim 1, in which the oil treated is cottonseed oil.

11. A process as set forth in claim 1, in which the treated oil is corn oil.
12. A process as set forth in claim 1, in which the oil treated is soya oil.
13. A process as set forth in claim 3, in which the treated oil is a sludging oil.

FRANCIS M. SULLIVAN.

REFERENCES CITED

The following references are of record in the file of this patent:

UNITED STATES PATENTS

| Number | Name | Date |
|---|---|---|
| 498,821 | Scollay | June 6, 1893 |
| 1,737,402 | Ayres | Nov. 26, 1929 |
| 2,110,789 | Clayton et al. | Mar. 8, 1938 |

FOREIGN PATENTS

| Number | Country | Date |
|---|---|---|
| 327,990 | Great Britain | Apr. 14, 1930 |